(12) United States Patent
Marik

(10) Patent No.: US 8,918,399 B2
(45) Date of Patent: Dec. 23, 2014

(54) EMERGING TOPIC DISCOVERY

(75) Inventor: Radek Marik, Rez (CZ)

(73) Assignee: CA, Inc., Islandia, NY (US)

( * ) Notice: Subject to any disclaimer, the term of this patent is extended or adjusted under 35 U.S.C. 154(b) by 191 days.

(21) Appl. No.: 12/716,844

(22) Filed: Mar. 3, 2010

(65) Prior Publication Data

US 2011/0219001 A1    Sep. 8, 2011

(51) Int. Cl.
*G06F 17/30* (2006.01)
*G06N 5/02* (2006.01)

(52) U.S. Cl.
CPC . *G06F 17/30* (2013.01); *G06N 5/02* (2013.01)
USPC .......................................................... 707/738

(58) Field of Classification Search
USPC ......................................................... 707/738
See application file for complete search history.

(56) References Cited

U.S. PATENT DOCUMENTS

| 5,732,260 | A  | * | 3/1998  | Nomiyama ........................... 1/1 |
| 7,568,148 | B1 | * | 7/2009  | Bharat et al. .................. 715/200 |
| 2002/0174131 | A1 | * | 11/2002 | Winer et al. ................... 707/102 |
| 2004/0230577 | A1 | * | 11/2004 | Kawatani .......................... 707/6 |
| 2005/0060312 | A1 | * | 3/2005  | Curtiss et al. ..................... 707/7 |
| 2006/0274938 | A1 | * | 12/2006 | Ortega et al. .................. 382/173 |
| 2007/0094384 | A1 | * | 4/2007  | Matsumura et al. ........... 709/224 |
| 2008/0115070 | A1 | * | 5/2008  | Whitney et al. ................ 715/764 |

OTHER PUBLICATIONS

Qian et al., Simultaneously Finding Fundamental Articles and New Topics Using a Community Tracking MMethod, PAKDD 2009, LNAI 5476, pp. 796-803.*
Wang et al., Automatic Online News Issue Construction in Web Environment, 2008.*

* cited by examiner

*Primary Examiner* — William Spieler
(74) *Attorney, Agent, or Firm* — Schwegman Lundberg & Woessner, P.A.

(57) ABSTRACT

This document discusses, among other things, a method for discovering a new topic. The method includes identifying a first topic within a first document and comparing the first topic to a first set of topics. The method then determines whether an emergence time for the first topic can be identified. The first topic is recognized as a new topic based on the comparison between the first set of topics and the emergence time for the first topic. For example, when the first topic does not exist within the first set of topics and the emergence time for the first topic can be identified, the first topic is recognized as a new topic.

14 Claims, 3 Drawing Sheets

EMERGING TOPIC DISCOVERY

BACKGROUND

Modern businesses typically monitor technologies pertinent to their business. The businesses may monitor the technologies informally, through casual recognition of a competitor's technology, or through formal means by periodically reading and understanding literature relevant to products or services provided by the business. Due in part to the internet, computers, and other technologies that have made it easier to create and publish articles, a plethora of articles are available for reviewing for a typical business. Furthermore, businesses and individuals alike will continue to create relevant articles on a given topic.

To aid in reviewing the large amount of articles present today, topic detection systems have been developed. These topic detection systems can scan, track, and process numerous articles in order to distill out pertinent information. The pertinent information can then be used by a business or individual to, for example, identify trends, opportunities, and threats to their business. Improvement in these topic detection systems, however, can generate more relevant and/or valuable information for an interested individual.

OVERVIEW

This document discusses, among other things, a method for discovering a new topic. The method includes identifying a first topic within a first document and comparing the first topic to a first set of topics. The method then determines whether an emergence time for the first topic can be identified. The first topic is recognized as a new topic based on the comparison between the first set of topics and the emergence time for the first topic. For example, when the first topic does not exist within the first set of topics and the emergence time for the first topic can be identified, the first topic is recognized as a new topic.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The present inventor has recognized, among other things, that identifying an emergence time for a given topic can be valuable information. Accordingly, the present inventor has developed a method and apparatus for topic discovery that can recognize an emergence time for a given topic.

Figure 1:
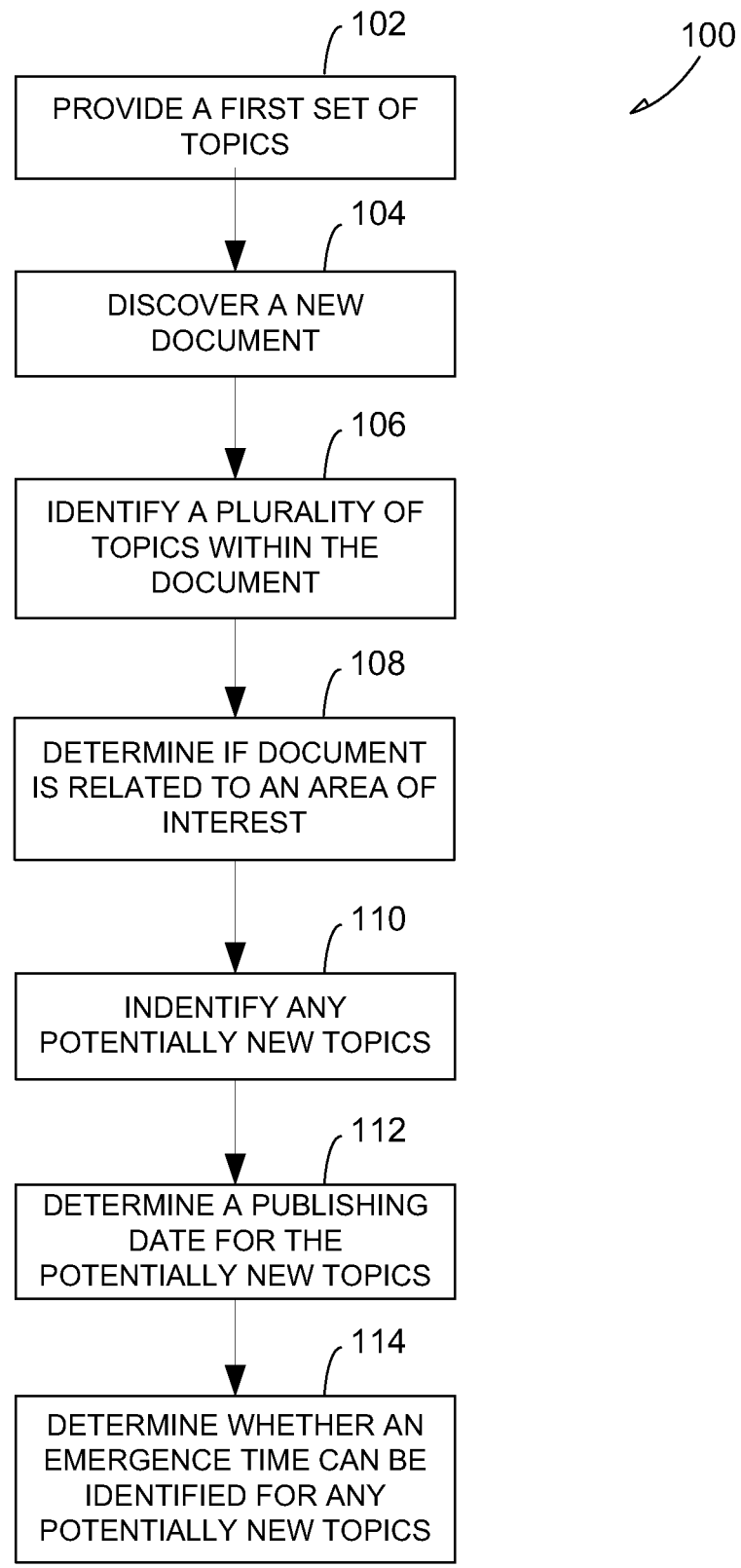
FIG. 1 illustrates an example of a method for topic discovery.

FIG. 1 illustrates an example of a method 100 for topic discovery. At 102, a first set of topics is provided. In an example, a topic can include one or more words occurring within a document. A document can include any written paper composed of a plurality of words. For example, a document can include a product brief, a webpage, a technical article, and an advertisement. Any given document can have multiple topics therein. For example, a document relating to the company Computer Associates may include a first topic "CA" that occurs 5 times within the document, a second topic "mainframe" that occurs 4 times within the document, a third topic "cloud computing", among other topics. In an example, a topic can also include multiple words that are near one another, but not necessarily adjacent to one another. That is, a topic can include a bigram (two related words near one another) or a trigram (three related words near one another). As examples, a topic can include the bigram of "management, solution" or the trigram of "database, performance, management".

In an example, the first set of topics is developed by processing a first set of documents (e.g., training documents) to obtain the topics therein. In another example, the first set of topics is manually provided based on general or discovered knowledge. In either case, a first set of topics is generated for comparison to newly discovered topics.

At 104, a document is discovered for processing to obtain potential new topics therefrom. In an example, the document is discovered by crawling the world wide web (or a defined set of webpages) and identifying a document that is not part of the first set of documents. When the first set of topics is generated from a first set of documents, any potential new topics will be discovered within documents not in the first set of documents, therefore, only documents that are not part of the first set of documents are used. Thus, when a document is discovered that is part of the first set of documents, the document is discarded and another document is discovered. In an example, a discovered document that is not in the first set of documents is added to the first set of documents, and further processed as described below. In an example, the crawl of the world wide web is limited based on search criteria (e.g., "cloud computing). In another example, the document is manually provided for processing. In yet another example, the document is discovered by scanning through a database of documents (e.g., a company related database, a database in a library, etc.).

At 106, a plurality of topics are identified within the discovered document. In an example, to identify topics from the discovered document, the document is converted into a text file. Stop words are then removed from the text file. Next, plurals are converted to singular form. Next, relevant and significant words are selected from the remaining words. In an example, these relevant and significant words are determined based on a term frequency—inverse document frequency weighting function (tf-idf). From the relevant and significant words, a plurality of topics are identified for the document. In an example, a topic is identified based on multiple occurrences of several words having a relationship to one another (e.g., collocated words). For example, if the words enterprise and management appear within three words of one another more than two times within the document, the bigram of "enterprise, management" can be identified as a topic within the document.

At 108, it is determined whether the document is related to an area of interest for the topic discovery. In an example, an area of interest for the topic discovery can include a particular technology (e.g., cloud computing), a particular business (e.g., computer associates), or other areas. In an example, a document is determined to be related to an area of interest based on the topics within the document. For example, a document can be determined to be related to the Computer Associates business when the document contains a topic of Computer Associates. In another example, a document can be determined to be related to the Computer Associates business when the document contains the topic cloud computing, which, for example, is considered related to Computer Associates.

In an example, a document determined to be related to an area of interest based on a comparison between the topics of the discovered document and a particular set of topics (also referred to herein as the "base topics") defining the area of interest. In an example, the set of base topics can be generated from one or more documents (e.g., training documents) that describe the particular area of interest (e.g., a business, technology, etc.). In an example, the discovered document can be considered related to a set of base topics when a threshold number of topics from the discovered document match a topic from the set of base topics. The threshold number of topics can include one or more than one topic. For example, for a threshold of 10, when 10 of the 30 topics identified within the discovered document match a topic in the set of base topics, the document can be considered related. In other examples, the threshold can include a percentage (e.g., 33%) of the topics from the set of topics for the discovered document.

In an example, the discovered document is determined to be related based on a vector distance between the set of topics from the discovered document and the set of base topics. To determine a vector distance, a vector is generated for the set of topics from the discovered document. In an example, a vector is based on which different topics occur within a set of topics, as well as the frequency of each different topic within the discovered document. Once a vector is generated for the set of topics from the discovered document, the two vectors are compared to a vector for the set of base topics. If the vectors are within a threshold distance of one another, then the discovered document is considered related to the set of base topics. In an example, a cosine function is used to determine the distance between the two vectors.

In an example, the discovered document is determined to be related by comparing the discovered document to a plurality of sets of base topics. For example, topic discovery may be performed with respect to a domain having a plurality of different areas of interest, and each area of interest can have its own set of base topics. A topic discovery with respect to Computer Associates may have a first area of interest pertaining to mainframes and a second area of interest pertaining to service oriented architecture. Each of these areas has a separate set of base topics, therefore, each of these areas has a different vector. Accordingly, the vector for the set of topics from the discovered document can be compared to each of the vectors for each of the sets of base topics. A distance between the vectors can then be determined. Accordingly, the discovered document can be compared to multiple areas of interest. In an example, if the discovered document is not determined to be related to any of the areas of interest, the discovered document is discarded, and another document is identified as described at 104. When the discovered document is considered related to at least one area of interest, the method 100 proceeds to 110 for further processing of the discovered document.

At 110, the topics from the discovered document are compared to the set of base topics to identify any potentially new topics. Any topics in the discovered document that do not exist in the set of base topics are considered potentially new topics. In an example, the topics from the discovered document are only compared to the sets of base topics to which the discovered document was considered related at 108. For example, if the discovered document was considered related to the mainframe area of interest, but not to the service oriented architecture area of interest, then, the topics from the discovered document are compared to the set of base topics for mainframes, but not the set of base topics for service oriented architecture.

At 112, a publishing date for each of the potentially new topics is determined. In an example, the publishing date corresponds to the first date in which the discovered document was publicly available. Accordingly, all potentially new topics from the discovered document have the same publishing date.

At 114, it is determined whether an emergence time for each potentially new topic can be identified. In an example, an emergence time can include a time that the topic started appearing in documents. In an example, the emergence time is the actual first time the topic appears in a document. In another example, the emergence time corresponds to a period of time in which there is a threshold number of increases in the quantity of appearances as compared to previous time periods. In other examples, the threshold quantity of appearances can include a percentage increase in the number of appearances, or other can be based on other relationships to the quantity. In an example, each topic can have only one emergence time.

In order to determine whether an emergence time can be identified, multiple documents are discovered and processed as described above in 104-112 of method 100. As new documents are discovered, and potentially new topics are identified from the new documents, a publishing date for each potentially new topic is identified as described in 112. After multiple publishing dates have been recorded for a potentially new topic, a timeline for the potentially new topic can be generated based on the publishing dates for each appearance of the potentially new topic. In an example, a potentially new topic is considered to have appeared once for each document that the topic occurs in at least once. Thus, in this example, multiple occurrences of a topic within the same document are considered only a single appearance. In another example, each occurrence within a document is considered a separate appearance. In this example, two occurrences in a first document and three occurrences in a second document are considered five appearances of the topic.

Figure 2:
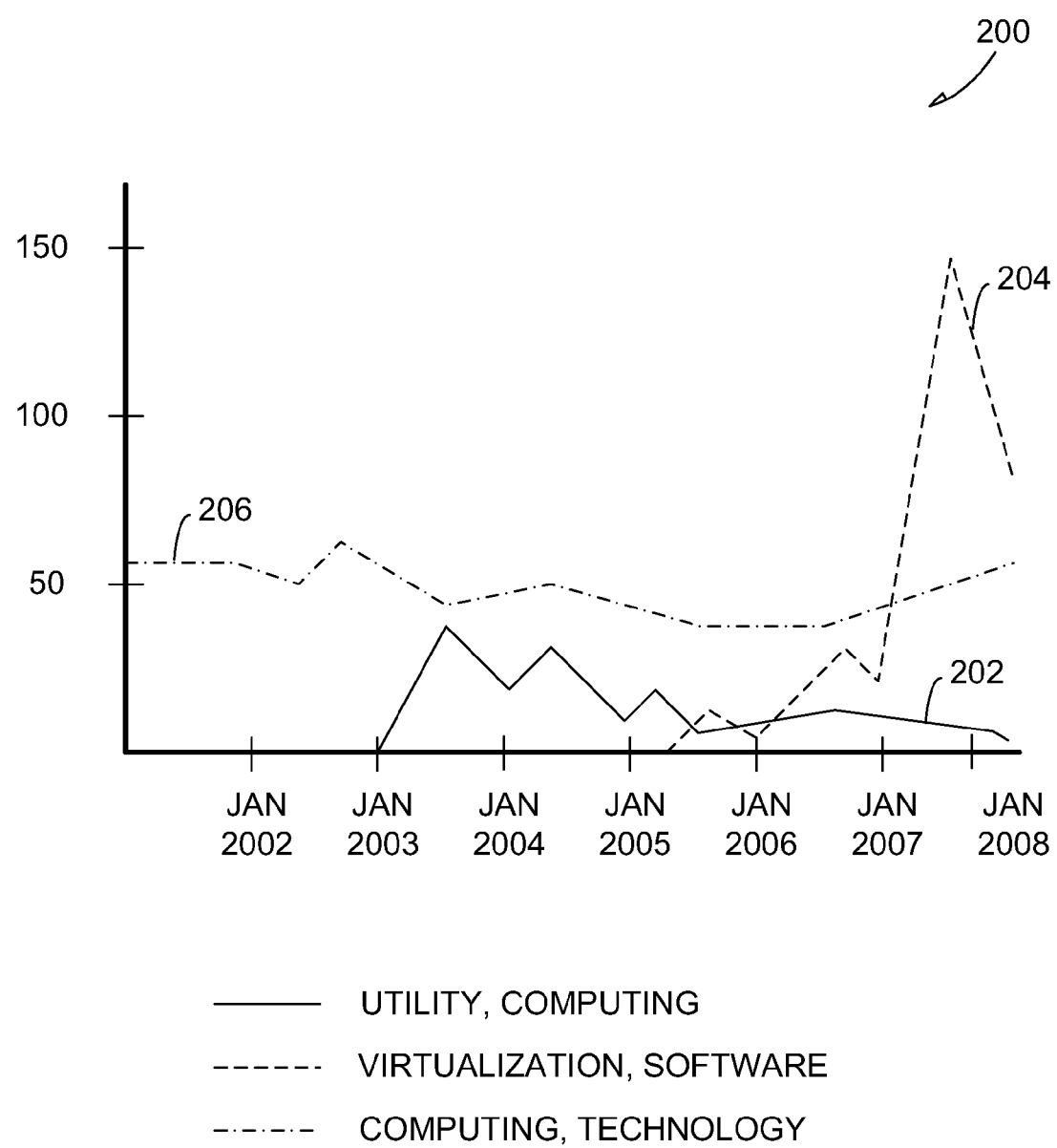
FIG. 2 illustrates a graph showing examples of timelines for potential new topics.

FIG. 2 illustrates a graph 200 showing an example of a plurality of timelines for potentially new topics. The vertical axis of the graph 200 represents the quantity of appearances and the horizontal axis represents the time of the appearance. Each timeline in graph 200 represents a different potentially new topic. Each potentially new topic is shown on the right hand side of the graph 200.

The "utility, computing" timeline 202 illustrates that the topic "utility, computing" had no appearances prior to January 2003. Between January 2003 and January 2004, however, the quantity of appearances increased to around 30. Accordingly, in an example, the increase in quantity of appearances between January 2003 and January 2004 can correspond to an identifiable emergence time for the topic "utility, computing". As another example, the "virtualization, software" timeline 204 illustrates relatively few appearances prior to January 2006. From January 2006 through January 2007, however, the quantity of appearances increased to around 30. After January 2007 the quantity of appearances increased to around 150. In an example, the increase in quantity from January 2006 to January 2007 can correspond to an identifiable emergence time for the topic "virtualization, software".

In an example, an emergence time can be identified based on a threshold quantity of appearances within a given period of time. For example, a threshold quantity of appearance can include 25 appearances within a one year period. According to this threshold, the emergence time for the "utility, computing" timeline 202 would correspond to the time period from January 2003 to January 2004. The emergence time for the topic "virtualization, software", would correspond to the time period from January 2006 to January 2007. In another example, the threshold quantity of appearances can include 50 appearances within a one year period. Here, the topic "utility, computing" would not have an emergence time within the timeline 202. The topic "virtualization, software" would have an emergence time that can be identified corresponding to the period from January 2007 to January 2008. In an example, the emergence time for a potentially new topic is set at the beginning of the period of the increase in appearances of the topic. For example, the emergence time for the topic "utility, computing" that corresponds to the period from January 2003 to January 2004, would be January 2003.

In an example, a potentially new topic that does not have a quantity of appearances above the threshold does not have an emergence time that can be identified. For example, the topic "computing, technology" has a timeline 206 that illustrates that the topic "computing, technology" had a generally consistent quantity of appearances throughout the time period illustrated in graph 200. Accordingly, if the threshold quantity of appearances is an 200% increase in the number of appearances, then the topic "computing, technology" no emergence time can be identified.

In an example, a potentially new topic that meets the threshold quantity of appearances is considered to have an identifiable emergence time and is recognized as a new topic. Accordingly, in an example, the new topic can be entered into each set of base topics for which the document containing the new topic was considered related. Additionally, the emergence time for the new topic can be recorded. In an example, a potentially new topic that does not have an identifiable emergence time is not considered to be a new topic.

Advantageously, determining an emergence time for a new topic can provide beneficial information for a reviewer utilizing the results of the topic discovery. Not only can new topics and their associated documents be identified for a reviewer, but an emergence time for each new topic can be provided. Thus, the reviewer can be provided with information regarding when each new topic became popular to further gauge how that new topic impacts the topic discovery.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code may be tangibly stored on one or more volatile or non-volatile computer-readable media during execution or at other times. These computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

Figure 3:
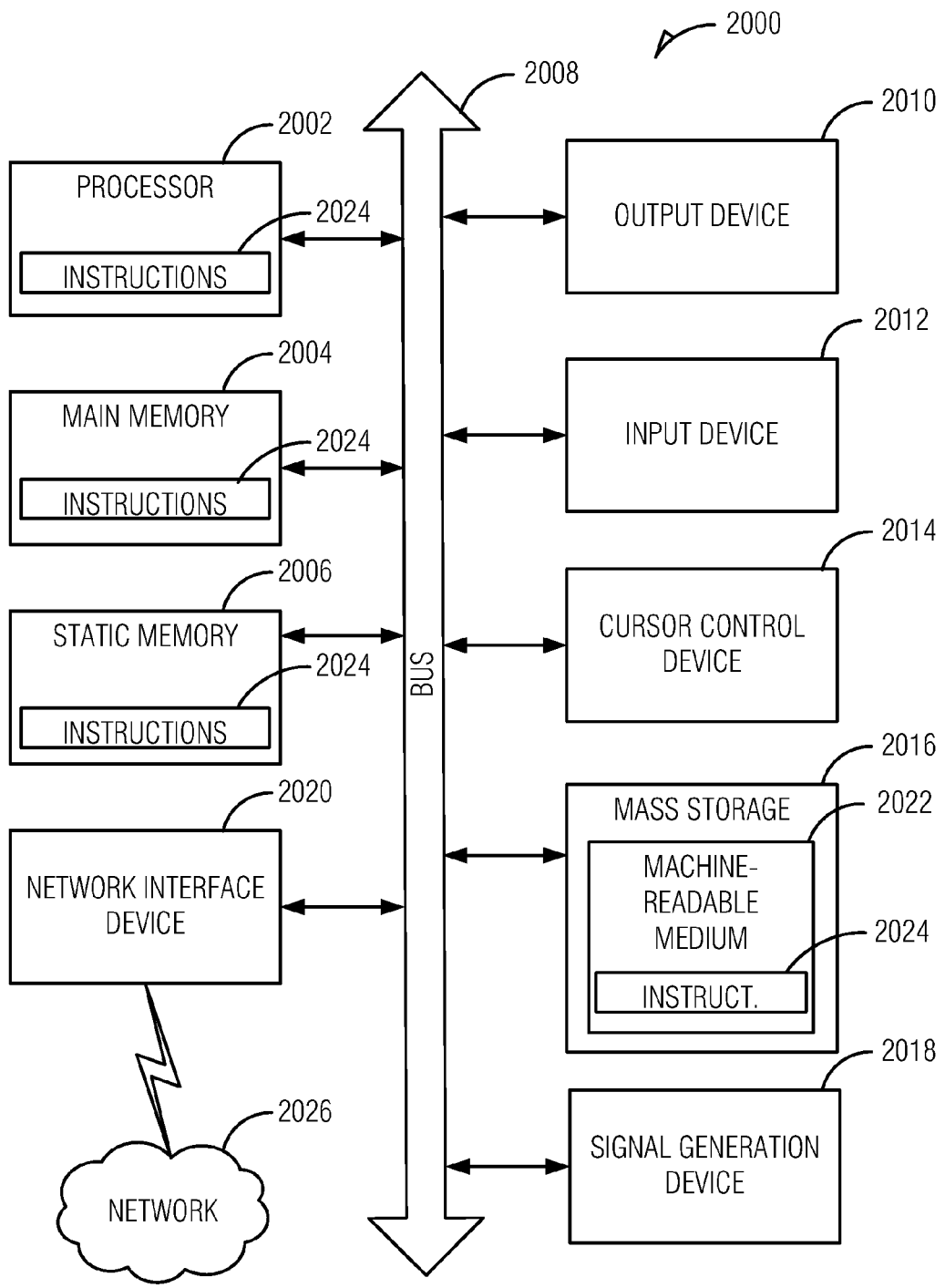
FIG. 3 illustrates an example of a machine for implementing the method of FIG. 1.

FIG. 3 is an example machine 2000. Upon reading and comprehending the content of this disclosure, one of ordinary skill in the art will understand the manner in which a software program can be launched from a computer-readable medium in a computer-based system to execute the functions defined in the software program. One of ordinary skill in the art will further understand the various programming languages that can be employed to create one or more software programs designed to implement and perform the methods disclosed herein. The programs can be structured in an object-orientated format using an object-oriented language such as Java or C++. Alternatively, the programs can be structured in a procedure-orientated format using a procedural language, such as assembly or C. The software components can communicate using any of a number of mechanisms well known to those of ordinary skill in the art, such as application program interfaces or interprocess communication techniques, including remote procedure calls. The teachings of various embodiments are not limited to any particular programming language or environment.

Thus, other embodiments can be realized. For example, an article of manufacture, such as a computer, a memory system, a magnetic or optical disk, some other storage device, and/or any type of electronic device or system can include one or more processors 2002 coupled to a machine-readable medium 2022 such as a memory (e.g., removable storage media, as well as any memory including an electrical, optical, or electromagnetic conductor) having instructions 2024 stored thereon (e.g., computer program instructions), which when executed by the one or more processors 2002 result in performing any of the actions described with respect to the methods above.

The machine 2000 can take the form of a computer system having a processor 2002 coupled to a number of components directly, and/or using a bus 2008. Such components can include main memory 2004, static or non-volatile memory 2006, and mass storage 2016. Other components coupled to the processor 2002 can include an output device 2010, such as a video display, an input device 2012, such as a keyboard, and a cursor control device 2014, such as a mouse. A network interface device 2020 to couple the processor 2002 and other components to a network 2026 can also be coupled to the bus 2008. The instructions 2024 can further be transmitted or received over the network 2026 via the network interface device 2020 utilizing any one of a number of well-known transfer protocols (e.g., HTTP). Any of these elements coupled to the bus 2008 can be absent, present singly, or present in plural numbers, depending on the specific embodiment to be realized.

The processor 2002, the memories 2004, 2006, and the storage device 2016 can each include instructions 2024 which, when executed, cause the machine 2000 to perform any one or more of the methods described herein. In alternative embodiments, the machine 2000 operates as a standalone device or can be connected (e.g., networked) to other machines. In a networked environment, the machine 2000 can operate in the capacity of a server or a client machine in server-client network environment, or as a peer machine in a peer-to-peer (or distributed) network environment. The machine 2000 can be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine 2000 is illustrated, the term "machine" shall also be taken to include any collection of machines that individually or jointly execute a set (or multiple sets) of instructions to perform any one or more of the methodologies discussed herein.

While the machine-readable medium 2024 is shown as a single medium, the term "machine-readable medium" should be taken to include a single medium or multiple media (e.g., a centralized or distributed database, and/or associated caches and servers, and or a variety of storage media, such as the processor 2002 registers, memories 2004, 2006, and the storage device 2016) that store the one or more sets of instructions 2024. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to tangible media, such as solid-state memories, optical, and magnetic media.

Example Embodiments

Example 1 includes a method for discovering a new topic. The method includes providing a first set of topics and using at least one computer. The method also includes identifying a first topic within a first document and comparing the first topic to the first set of topics. The method also includes determining whether an emergence time can be identified for the first topic. The method also includes recognizing the first topic as a new topic based on the comparison between the first topic and the first set of topics and whether an emergence time can be identified for the first topic.

In Example 2, the subject matter of Example 1 can optionally include using the at least one computer to identify the first set of topics from at least one document corresponding to an area of interest for topic discovery.

In Example 3, the subject matter of any one of Examples 1-2 can optionally include wherein the at least one document includes at least one of a product brief, a webpage, and a technical article.

In Example 4, the subject matter of any one of Examples 1-3 can optionally include identifying a plurality of topics from the first document, determining a vector distance between the plurality of topics from the first document, and recognizing the first document as related to the first set of topics based on the vector distance between the first document and the first set of documents.

In Example 5, the subject matter of any one of Examples 1-4 can optionally include generating a first vector based on which different topics occur within the plurality of topics and a frequency of each different topic in the plurality of topics. The method can also include generating a second vector based on which different topics occur within the first set of topics and a frequency of each different topic in the first set of topics, wherein determining a vector distance includes comparing the first vector to the second vector.

In Example 6, the subject matter of any one of Examples 1-5 can optionally include determining an emergence time by identifying a plurality of documents having the first topic therein and determining the emergence time based on the publishing date for each of the plurality of documents.

In Example 7, the subject matter of any one of Examples 1-6 can optionally include determining an emergence time by recognizing a quantity of appearances of the first topic within a time period as corresponding to the emergence time when the quantity of appearances is above an appearance threshold.

In Example 8, the subject matter of any one of Examples 1-7 can optionally include recognizing a first topic by identifying collocated words occurring multiple times within the first document.

Example 9 includes a system comprising a memory having software stored thereon and a programmable processor communicatively coupled to the memory, wherein the software, when executed by the programmable processor, causes the programmable processor to indentify a first topic within a first document and compare the first topic to a first set of topics. The software can also cause the programmable processor to determine whether an emergence time for the first topic can be identified and recognize the first topic as a new topic based on the comparison between the first topic and the first set of topics and whether an emergence time can be identified for the first topic.

In Example 10, the subject matter of Example 9 can optionally include wherein the software causes the programmable processor to indentify the first set of topics from at least one document corresponding to an area of interest for topic discovery.

In Example 11, the subject matter of any one of Examples 9-10 can optionally include wherein the at least one document includes at least one of a product brief, a webpage, and a technical article.

In Example 12, the subject matter of any one of Examples 9-11 can optionally include identifying a plurality of topics from the first document, determining a vector distance between the plurality of topics from the first document and the first set of topics. The method can also include recognizing the first document as related to the first set of topics based on the vector distance between the first document and the first set of documents.

In Example 13, the subject matter of any one of Examples 9-12 can optionally include generating a first vector based on which different topics occur within the plurality of topics and a frequency of each different topic in the plurality of topics. The method can also include generating a second vector based on which different topics occur within the first set of topics and a frequency of each different topic in the first set of topics, wherein determining a vector distance includes comparing the first vector to the second vector.

In Example 14, the subject matter of any one of Examples 9-13 can optionally include determining an emergence time by identifying a plurality of documents having the first topic therein and determining the emergence time based on the publishing date for each of the plurality of documents.

In Example 15, the subject matter of any one of Examples 9-14 can optionally include wherein the software causes the programmable processor to recognize a quantity of appearances of the first topic within a time period as corresponding to the emergence time when the quantity of appearances is above an appearance threshold.

In Example 16, the subject matter of any one of Examples 9-15 can optionally include wherein the software causes the programmable processor to recognize a first topic by identifying collocated words occurring multiple times within the first document.

Example 17 includes a machine-readable medium including instructions which, when executed by a machine, cause the machine to perform operations. The operations include indentifying a first topic within a first document and comparing the first topic to a first set of topics. The operations also include determining whether an emergence time for the first topic can be identified and recognizing the first topic as a new topic based on the comparison between the first topic and the first set of topics and whether an emergence time can be identified for the first topic.

In Example 18, the subject matter of Example 17 can optionally include identifying a plurality of topics from the first document and determining a vector distance between the plurality of topics from the first document and the first set of topics. The subject matter can also include recognizing the first document as related to the first set of topics based on the vector distance between the first document and the first set of documents.

In Example 19, the subject matter of any one of Examples 17-18 can optionally include identifying a plurality of documents having the first topic therein and determining the emergence time based on the publishing date for each of the plurality of documents.

In Example 20, the subject matter of any one of Examples 17-20 can optionally include determining an emergence time includes recognizing a quantity of appearances of the first topic within a time period as corresponding to the emergence time when the quantity of appearances is above an appearance threshold.

Additional Notes

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. A method for discovering a new topic, the method comprising:
    providing a first set of topics;
    using at least one computer to:
        identify a first topic within a first document;
        compare the first topic to the first set of topics;
        determine whether an emergence time is identified for the first topic, wherein the emergence time is based on a publishing date of at least one document, the publishing date corresponding to a date the document was first publicly available, and wherein the emergence time is identified when a quantity of appearances of the first topic in a later time period is above an appearance threshold when compared to one or more number of appearances of the topic in an earlier time period;
        recognize the first topic as a new topic based on the comparison between the first topic and the first set of topics and whether an emergence time can be identified for the first topic; and
        set the emergence time for the new topic to correspond to the beginning of the later time period.

2. The method of claim 1, comprising using the at least one computer to:
    identify the first set of topics from at least one document corresponding to an area of interest for topic discovery.

3. The method of claim 2, wherein the at least one document includes at least one of a product brief, a webpage, and a technical article.

4. The method of claim 1, comprising using the at least one computer to:
    identify a plurality of topics from the first document;
    determine a vector distance between the plurality of topics from the first document and the first set of topics; and
    recognize the first document as related to the first set of topics based on the vector distance between the first document and the first set of documents.

5. The method of claim 4, comprising using the at least one computer to:
    generate a first vector based on which different topics occur within the plurality of topics and a frequency of each different topic in the plurality of topics; and
    generate a second vector based on which different topics occur within the first set of topics and a frequency of each different topic in the first set of topics, wherein determine a vector distance includes compare the first vector to the second vector using a cosine function.

6. The method of claim 1, wherein using the at least one computer to recognize a first topic includes using the at least one computer to identify collocated words occurring multiple times within the first document.

7. A system comprising:
a memory having software stored thereon; and
a programmable processor communicatively coupled to the memory, wherein the software, when executed by the programmable processor, causes the programmable processor to:
identify a first topic within a first document;
compare the first topic to a first set of topics;
determine whether an emergence time for the first topic is identified, wherein the emergence time is based on a publishing date of at least one document, the publishing date corresponding to a date the document was first publicly available, and wherein the emergence time is identified when a quantity of appearances of the first topic in a later time period is above an appearance threshold when compared to one or more number of appearances of the topic in an earlier time period;
recognize the first topic as a new topic based on the comparison between the first topic and the first set of topics and whether an emergence time can be identified for the first topic; and
set the emergence time for the new topic to correspond to the beginning of the later time period.

8. The system of claim 7, wherein the software, when executed by the programmable processor, causes the programmable processor to:
identify the first set of topics from at least one document corresponding to an area of interest for topic discovery.

9. The system of claim 8, wherein the at least one document includes at least one of a product brief, a webpage, and a technical article.

10. The system of claim 7, wherein the software, when executed by the programmable processor, causes the programmable processor to:
identify a plurality of topics from the first document;
determine a vector distance between the plurality of topics from the first document and the first set of topics; and
recognize the first document as related to the first set of topics based on the vector distance between the first document and the first set of documents.

11. The system of claim 10, wherein the software, when executed by the programmable processor, causes the programmable processor to:
generate a first vector based on which different topics occur within the plurality of topics and a frequency of each different topic in the plurality of topics; and
generate a second vector based on which different topics occur within the first set of topics and a frequency of each different topic in the first set of topics, wherein determine a vector distance includes compare the first vector to the second vector using a cosine function.

12. The system of claim 7, wherein the software, when executed by the programmable processor, causes the programmable processor to:
recognize a first topic by identifying collocated words occurring multiple times within the first document.

13. A machine-readable medium including instructions which, when executed by a machine, cause the machine to perform operations comprising:
identifying a first topic within a first document;
comparing the first topic to a first set of topics;
determining whether an emergence time for the first topic is identified, wherein the emergence time is based on a publishing date of at least one document, the publishing date corresponding to a date the document was first publicly available, and wherein the emergence time is identified when a quantity of appearances of the first topic in a later time period is above an appearance threshold when compared to one or more number of appearances of the topic in an earlier time period;
recognizing the first topic as a new topic based on the comparison between the first topic and the first set of topics and whether an emergence time can be identified for the first topic; and
setting the emergence time for the new topic to correspond to the beginning of the later time period.

14. The machine readable medium of claim 13, wherein the instructions, when executed by the machine, cause the machine to perform operations comprising:
identifying a plurality of topics from the first document;
determining a vector distance, using a cosine function, between the plurality of topics from the first document and the first set of topics; and
recognizing the first document as related to the first set of topics based on the vector distance between the first document and the first set of documents.

* * * * *